Patented June 1, 1948

2,442,536

UNITED STATES PATENT OFFICE 2,442,536

CONFECTIONERS' HARD BUTTER PREPARED BY LOW TEMPERATURE INTERESTERIFICATION

Eddy W. Eckey, Wyoming, Ohio, assignor to The Procter & Gamble Company, Cincinnati, Ohio, a corporation of Ohio No Drawing. Application November 23, 1946, Serial No. 711,840

7 Claims. (Cl. 99—118)

This invention relates to the preparation of confectioners' hard butter from vegetable oils.

The present application contains matter divided from my copending application Serial No. 628,372, filed November 13, 1945, together with added disclosure as a continuation-in-part over the disclosure divided from said application. In this copending application I have described and claimed the employment of my process of low temperature interesterification (set forth broadly in my copending application Serial No. 562,062, filed November 6, 1944) in the treatment of glycerides for use in edible fats and have made specific reference to the use of the process in the manufacture of confectioners' hard butter. The present application is designed to describe and claim more fully this specific application of the process and the products produced thereby.

Confectioners' hard butters are employed as the fat ingredient in the manufacture of candy and cooky coatings, icings, and fillings for candies, cookies and other confections. In candy manufacture, for example, cocoa butter has long been employed as the naturally occurring confectioners' hard butter. This fat is characterized by its sharp melting properties, its quality to break sharply and suddenly, that is, its "snap," at 70° F. and slightly above, and its ability to melt rapidly and completely at body temperature. However, there exist on the market many products of similar characteristics derived from other fats and oils, particularly tropical nut oils characterized by their high content of combined $C_{12}$ and $C_{14}$ fatty acids, commonly referred to as "oils of the coconut oil group," and including coconut oil, palm kernel oil, babassu oil, tucum nut oil, and the like. (See Lewkowitsch, "Chemical Technology and Analysis of Oils, Fats and Waxes," Sixth edition, volume 2, pages 500 and 617.)

The customary practice of preparing confectioners' hard butter from these vegetable oils includes cooling the oil to promote crystallization of the higher melting constituents, then subjecting the thus grained oil to hydraulic pressing whereby the liquid and solid constituents are separated. The solid constituent, consisting predominantly of the higher melting glycerides of the oil, and, in the case of coconut oil, amounting to about nineteen percent of the original charge, may be directly converted into edible form by deodorization, or may be first subjected to a hydrogenation procedure or admixed with a hard stock such as substantially completely hydrogenated cottonseed oil to improve its heat resistance. This type of processing requires considerable manual labor, provides only part of the oil as desired product, and is expensive. Consequently much research has been directed toward the development of improved processes, especially those in which fractional crystallization of the oil and separation of the fractions is unnecessary.

It is an object of the present invention to provide an improved process for the manufacture of confectioners' hard butter from vegetable oils of the coconut oil group.

A further object is to provide a process for the manufacture of confectioners' hard butter from oils of the coconut oil group whereby expensive steps of fractionation and separation of the solid and liquid glycerides of the oil are avoided.

A still further object is to derive from an oil of the coconut oil group a confectioners' hard butter which contains substantially all of the fatty constituents of the original oil but which is higher melting without being waxy in the mouth at body temperature, has better snap at 70° F., and is possessed of sharp melting characteristics, i. e. the product melts completely within a narrow temperature range.

In the practice of the present process, an oil of the coconut oil group, such as coconut oil for example, or a partially hydrogenated derivative of same is subjected to the low temperature interesterification process more fully set forth in my copending application Serial No. 562,062. This process is based on the discovery that under the proper conditions of treatment rearrangement of fatty acid radicals of the oil may be directed and controlled to achieve results not heretofore obtained. For example, if the oil of the coconut oil group, at least a substantial part of which is liquid, is admixed with a suitable catalyst and interesterification is permitted to take place at a temperature below that at which the liquid phase is saturated with respect to relatively high melting triglycerides formed in the course of the interchange of fatty acid radicals will crystallize from the liquid fat and take no further part in the interchange process. Thus, as molecules having low solubility in the liquid fat phase are formed and crystallize out of solution, further rearrangement of such molecules is prevented. Consequently the percentage of higher melting molecules in the whole fat mixture tends to increase as long as crystallization continues with resulting increase in melting point. Crystallization of such relatively insoluble solid triglycerides can continue as long as the solubility thereof in the liquid fat phase at the temperature of reaction is exceeded by the amount newly formed in the reaction. After the desired change in characteristics has been effected, the oil is preferably processed further by known methods to complete its preparation for use in edible products.

In the application of the low temperature interesterification process to oils such as coconut oil which have a relatively low content of combined high melting fatty acid (e. g. palmitic or stearic acid) and of combined low melting fatty acids (e. g. oleic acid or linoleic acid), the change effected in certain physical characteristics, such as increase in spread between initial and complete melting points (American Oil Chemists Society Capillary Method as of Jan. 1, 1944) is not as marked as in the case of cottonseed oil and soybean oil which contain appreciable amounts of these combined fatty acids. Thus, although the melting point of coconut oil, for example, may be raised by the application of low temperature interesterification in preparing such fat for use as confectioners' hard butter, the amount of triunsaturated glyceride formed is not sufficient to detract materially from the sharp melting characteristics of the higher melting constituents of the fat. Furthermore, the constitution of an oil such as coconut oil is such that the glycerides which precipitate during interesterification are predominantly saturated triglycerides containing more than one kind of saturated fatty acid in each molecule (sometimes called "mixed triglycerides"), and such triglycerides, I have found, seem to be more effective than triglycerides of a single saturated fatty acid in retaining liquid constituents on crystallization whether mixed in as a solid solution or enmeshed in the crystalline structure. Accordingly, the use of low temperature interesterification on oils of the coconut oil group is of outstanding value in the production of a higher melting fat with sharp melting characteristics without employing expensive processing steps such as fractional crystallization.

Products of the present invention, accordingly, are characterized by a higher melting point than the original oil in its natural condition and by a greater concentration of myristic and higher saturated fatty acids in the higher melting triglyceride components. As the examples below will show, such products comprising substantially all of the combined fatty acids of the original oil, are at least as good as, and by proper selection of conditions may be made superior to confectioners' hard butters prepared from the original oil by the conventional methods of fractional crystallization and recovery of the solid fraction by hydraulic pressing.

The invention will be more clearly understood from the following illustrative examples, in which parts are shown by weight, and the accompanying detailed description.

*Example 1.*—A sample of refined, filtered, and dried coconut oil having a saponification value of 255.2 and an iodine number of 8.6 was agitated for about ½ hour at 120° F. in a closed container with 0.3% of its weight of sodium methoxide in the form of a 10% suspension in xylene. The temperature of the mixture was then gradually reduced to 70° F. and held at that temperature for about one day. Thereafter the mixture was further cooled to 60° F. and reaction permitted to take place for almost five days. At the end of this rearrangement period and without substantial change in temperature, the catalyst was inactivated by the addition of slightly more than an equivalent amount of glacial acetic acid. The oil was then alkali refined, bleached and deodorized. Incipient and complete melting points, shown below, were determined by the closed capillary tube method.

Samples of the processed oil at about 120° F. were poured into small pans and stored at 50° F. until the samples solidified into small cakes about 2 inches by 3 inches by ½ inch. After the samples had reached a temperature of 50° F., they were then stored at 70° F. for at least 16 hours. Thereafter the quality of the product to break sharply and suddenly (snap) was determined by forcing the edge of a knife, spatula, or other similar instrument into the cake of solidified fat near the edge, noting hardness, and snap of the fat on fracture. Samples of the product were also eaten in order to determine edible characteristics, such as lack of waxiness, sharpness of fracture during chewing, rapidity of melting, and smoothness during melting at body temperature. These results were compared with results of corresponding examination made on the original oil and a sample of confectioners' hard butter produced from the coconut oil by the customary method of fractional crystallization. The superiority of the product of the present invention is evident from the data shown in the following table.

| Sample | Incipient Melting Point, °C. | Complete Melting Point | | Snap at 70° F. | Eating Characteristics at Body Temperature | | |
|---|---|---|---|---|---|---|---|
| | | °C. | °F. | | Smoothness | Rapidity of Melting | Waxiness |
| Original oil | 26.5 | 28.6 | 83.5 | Poor | Good | Fast | None. |
| High melting fraction obtained by conventional fractional crystallization—42.8% of original oil. | 31.0 | 32.5 | 90.5 | Fair-good | ...do | Good | Do. |
| Whole oil product from this example | 29.5 | 32.7 | 90.8 | Good | ...do | ...do | Do. |

*Example 2.*—Refined, filtered, and dried coconut oil in liquid condition was thoroughly mixed with about 0.2% sodium methoxide as a 10% suspension in xylene. The temperature of the mixture was gradually reduced to a final temperature of 60° F. over a period of several days. Thereafter the catalyst was inactivated by the addition of slightly more than an equivalent amount of glacial acetic acid, and the product was washed and filtered. The rearranged coconut oil had sharp melting characteristics, the final melting point being 93.9° F., and had sufficiently good properties in other respects, such as snap at 70° F., to serve as a confectioners' hard butter without fractional crystallization or hydrogenation. Its characteristics were superior to those of a product prepared by graining and pressing coconut oil to recover the higher melting components and by adding to this product a small amount of substantially completely hydrogenated cottonseed oil to give it stability at the higher temperatures.

In place of the coconut oil, palm kernel oil and babassu oil or other oil of the coconut oil group may be used.

*Example 3.*—A sample of refined and bleached palm kernel oil having a saponification value of 242.3 and an iodine number of 18.0 was chilled to produce a cloud of solid fat crystals, then warmed slightly until only a light cloud of crystals remained. To this oil was added 0.3% of its weight of sodium methoxide in the form of a 10% suspension in xylene. The mixture was charged to a closed container adapted to be rotated and to effect thereby agitation of the mixture during reaction. The temperature was gradually reduced to 70° F. at which temperature the reaction was allowed to proceed for about one day. The mixture was then further cooled to 60° F. and reaction permitted to take place for about 5 days. At the end of the rearrangement and without substantial change in temperature, the methoxide catalyst was inactivated by the addition of slightly more than an equivalent amount of glacial acetic acid. The oil was then alkali refined, bleached, and deodorized. Physical characteristics were determined as in the case of Example 1. The results were as follows:

as above described are satisfactory for use directly as confectioners' hard butter, there may some advantages in subjecting the product of the rearrangement to a fractional crystallization step whereby desired solid triglycerides are separated for use as a confectioners' hard butter. Such products are especially valuable for use in the preparation of confections which may meet with exceptionally high temperature conditions during shipping, storage, or sale. In this case, the proportion of solid triglycerides separated is much higher than that separated from the original oil before rearrangement.

The final melting point alone cannot be used as a basis for determining the suitability of a product as a confectioners' hard butter. Snap and eating qualities are also determining factors. Some products produced by hydrogenation of coconut oil or of the solid fraction resulting from fractional crystallization thereof, or by the addition of hard stock such as substantially completely hydrogenated cottonseed oil to the solid fraction may have melting points around body temperature but yet be soft or mushy and lack snap at 70 to 80° F. and therefore be unsuitable as confectioners' hard butters. Of course, as

| Sample | Incipient Melting Point, °C. | Complete Melting Point | | Snap at 70° F. | Eating Characteristics at Body Temperature | | |
|---|---|---|---|---|---|---|---|
| | | °C. | °F. | | Smoothness | Rapidity of Melting | Waxiness |
| Original CNO | 23.6 | 25.2 | 77.3 | None | Excellent | Good | None. |
| High melting fraction obtained by conventional fractional crystallization—19.5% of original oil. | 28.5 | 30.8 | 87.4 | Fair-good | Good | do | Do. |
| Whole oil product from this example | 29.2 | 33.0 | 91.4 | Good | do | do | Do. |

As an auxiliary example, babassu oil may be substituted for palm kernel oil. A product is obtained which is substantially as good as the solid fraction obtained in about 22% yield from the babassu oil by conventional methods of hard butter production involving fractional crystalization and separation of liquid and solid fractions.

If it is desired to increase the final melting point of the confectioners' hard butter as produced in accordance with the above examples, Example 1 for instance, it is possible to accomplish this end by hydrogenating the rearranged oil to an iodine value from about one to five, for example. It is to be understood, however, that the application of the hydrogenation step may increase the final melting point of the product to such a degree that it may have a waxy consistency and not melt rapidly or completely at body temperature. Accordingly, the hydrogenation step should preferably be controlled so as to obtain the characteristics desired in the final product, more complete saturation being desirable for those products designed for use in climates where the higher temperatures are encountered.

Higher melting type products may also be made by applying the low temperature interesterification process to oils of the coconut oil group which have been first hydrogenated. Here also the degree of hydrogenation is dependent on the characteristics desired in the final product and cannot be set forth with particularity. In the process of Example 1, for instance, the oil may be partially hydrogenated to an iodine value from about one to about five before interesterification, to produce higher melting products with greater heat resistance.

Although I have found that products produced above suggested, products may be hydrogenated or mixed with sufficient hard stock to give desired hardness or snap at such temperatures, but then complete melting does not occur at body temperature and the coating, candy, icing, or other confection in which the hard stock is used to furnish the fat constituent may possess a waxiness in the mouth during eating that is highly undesirable.

In the process above described the temperature at which most fats of the coconut oil group and their partially hydrogenated derivatives can begin to form solid crystals is below 130° F. and therefore the temperature at which the rearrangement is conducted in accordance with this invention, for most practical applications, is below 120° F. but sufficiently high that a substantial proportion of the fat is liquid, and sufficiently low to permit the crystallization from the liquid fat of solid triglyceride fats of low solubility formed in the rearrangement. It has been found, for example, that the reaction will take place at temperatures at which the mixture appears to be solid, but actually contains liquid fat entangled in the crystals of precipitated solid glycerides.

In the above examples the maximum final temperature at the completion of interesterification is in the neighborhood of 60° F. Lower temperatures may be employed such as 40° to 50° F. if it is desirable to increase the melting point of the oil of the coconut oil group above that shown in the examples. Similarly, temperatures higher than 60° F. may be employed if products of lower final melting point are desired. It will be understood, of course, that products obtained by the use of such higher temperatures will not have been rearranged to the same degree as those products produced at the lower temperatures, and consequently their physical properties, including snap at 70° F., may not be as desirable as those products obtained by processing at lower temperature.

Ordinarily it will be advantageous to reduce the temperature during interesterification gradually, or in steps, to the final temperature decided upon. However, in some cases it will be preferable to conduct the rearrangement at nearly a constant temperature or at a low temperature reached by sudden cooling, or the oil may be seeded, for example as shown in Example 3 above. My process is not limited to any set schedule of temperature treatment, although, as indicated, the gradual reduction to the final temperature is preferred.

Effective practice of the invention does not depend upon the use of any particular catalyst. Any material which will promote the interchange of fatty acid radicals at the low temperatures required for crystallization during interesterification is suitable for use.

My copending application Serial No. 628,372 fully discusses the subject of catalysts and points out that the true catalyst for the interesterification may be the product of the reaction of the triglyceride fat and the catalytic material added. Whatever may be the true catalyst, it can be shown that substances which are effective in bringing about the interesterification include compounds which include sodium or potassium for example combined with practically any material less acidic than phenol. Thus various alkoxides such as sodium, potassium, and lithium methoxides, ethoxides, propoxides and butoxides are suitable, as are alkoxides made from alcoholic compounds in general such as lauryl alcohol, ethylene glycol, oleic acid monoglyceride, and many others. Also alkoxides in which the cation is the tetrasubstituted ammonium radical, such as tetramethyl ammonium methoxide and lauryl benzyl dimethyl ammonium methoxide, show activity in promoting the interesterification reaction. Other substances which may be added to further the interesterification reaction at low temperature are: alkali-metal-organic compounds containing the alkali metal atom directly bound to a carbon atom as in triphenyl methyl sodium, or to a nitrogen atom as in potassium pyrrole; finely divided metallic potassium or sodium in xylene; and an anhydrous suspension of potassium hydroxide in a hydrocarbon solvent such as undecane.

Because of the great variety of materials that may be used to form the active catalyst, and because the actual structure of the true catalytic material is as yet not accurately known, the catalytic materials are generically referred to in the claims as "low temperature interesterification catalysts."

Amounts of low temperature interesterification catalyst equivalent to 0.5 percent by weight of sodium methoxide based on the weight of the fat may be employed, but there is no particular advantage in employing quantaties much in excess of 0.3 percent. Even small quantities such as 0.03 per cent are effective in promoting the rearrangement at low temperature, but I have found that the reaction proceeds at a rather low rate unless at least 0.05 per cent is employed. My preferred range of catalyst usage is the equivalent of from about 0.05 per cent to about 0.5 per cent of sodium methoxide.

The catalysts that are used in practicing the present invention are highly efficient in effecting regrouping of fatty acid radicals in the triglycerides, and for this reason it is preferable to render the catalysts inactive after the desired rearrangement has taken place and before the temperature of the fat is allowed to rise appreciably, so that substantially no modification results during subsequent handling of the fat. In order to retain the degree and kind of rearrangement effected at low temperature, it is preferable to treat the mixture containing the catalyst with an acid reacting compound such as hydrochloric acid, phosphoric acid, carbonic acid, glacial acetic acid, etc., and thereby inactivate the catalyst before any undesirable reversion or other change in the desired rearrangement takes place.

In the use of the alkoxide catalysts in the practice of the invention, the usual precautions of having the oil dry and neutral, the catalyst finely divided and well dispersed, and of excluding oxygen and carbon dioxide during the reaction should be observed in order to achieve optimum results.

Products immediately resulting from the interesterification process may not be suitable for direct use as an edible product, due to undesirable odor, fatty acid content, or other factors. However, conversion into an edible product may be effected in the customary manner by alkali refining, filtering or bleaching, and deodorization with steam at elevated temperature under reduced pressure. Thereafter the product is usually panned and chilled, or otherwise converted into cake form or other form suitable for shipping and adapted for use by the customer.

It has been shown above that the products of the present invention have more snap at temperatures in the neighborhood of 70° F. than do the original oils from which the products of the present invention are produced and are at least as good in this characteristic as are the products obtained from the original oil by fractional crystallization. It is preferable that products such as are here concerned possess sharp melting characteristics, that is incipient and complete melting occur over a narrow range of temperature. If incipient melting point determinations as made by current methods were accurate and reproducible they could be reliably used in conjunction with the final melting points to define and identify with complete definiteness the products of the present invention. However, in the absence of a reliable method for the determination of the incipient melting point of the fat, the superiority of products of the present invention is expressed in terms which are indicative of the sharp melting charactertistics, that is, snap at a temperature in the neighborhood of 70° F. Thus a product that melts within a narrow range near body temperature will likely possess snap at 70° F. because all or substantially all of the fat is in solid condition.

Many ways of increasing the melting point of oils of the coconut oil group have been tried to make such oils suitable for use as confectioners' hard butter without fractionation or other expensive processing. Thus hydrogenation, ordinary chemical rearrangement in the liquid phase with high melting fats, physical mixing with harder or higher melting fats, and similar processes have been tried. In all cases, however, the products possess some undesirable characteristic such as undesirable softness at temperatures below body temperature, waxiness at body temperature, or lack of snap.

Products of the present invention derived from coconut oil, palm kernel oil and babassu oil, however, have final melting points above 87° F. but not substantially above 100° F. and satisfy the requirements of a confectioners' hard butter in that they are sharp melting, possess satisfactory snap at 70° F., melt substantially completely at body temperature, and in many instances melt with such rapidity as to give a desirable sensation of cooling during eating. In physical characteristics, therefore, they are superior or equal to those solid products of substantially the same melting point characteristics derived from the same original oil by fractional crystallization. In addition the products are made directly from the whole oil rather than from only a small fraction thereof, the result being a greater supply of a less expensive product for the consumer. In the case of hydrogenated products or products from hydrogenated oils, the same advantages in general will accrue, except that melting points may be as high as 105°—115° F. but yet not so high that the products possess a distinct waxiness at body temperatures when eaten.

Efforts to duplicate products of the present invention by mixing various esters of the fatty acids in the correct proportions to give a product having the composition of coconut oil or other oil of the coconut oil group, and at the same time having the characteristics of the products produced by the application of low temperature interesterification have not been successful. An analysis of the conditions existing during preparation of the products according to the present invention may indicate the reason why. In the practice of low temperature interesterification on a vegetable oil such as coconut oil for example, the triglycerides which precipitate during reaction and which therefore have a dominating influence on the characteristics of the final product are not necessarily the highest melting triglycerides which are or can be formed from the constituent fatty acids in the fat, but rather glycerides whose crystallographic properties favored their precipitation. Therefore, without knowledge of the kinds and proportions of triglycerides resulting from practice of low temperature interesterification on the oil it is impossible to synthesize the compositions resulting in the practice of this invention. In fact, as far as I am aware, a satisfactory confectioners' butter has not been made directly from the whole oil by any method of synthesis and accordingly it is my belief that the product is basically new.

Having thus described my invention, what I claim and desire to secure by Letters Patent is:

1. In the process of making a confectioners' hard butter, the steps which comprise intimately contacting a glyceride fat of the group consisting of oils of the coconut oil group and their hydrogenated derivatives with a low temperature interesterification catalyst at a temperature, below 130° F., at which a substantial portion of the fat is liquid, to cause rearrangement of the fatty acid radicals in the fat molecules, the temperature being sufficiently low to permit crystallization of solid triglycerides of low solubility as same are formed, maintaining such temperature of the glyceride fat while progressive crystallization of solid triglycerides of low solubility takes place, inactivating the catalyst and converting the glyceride mixture into an edible confectioners' hard butter.

2. In the process of making a confectioners' hard butter, the steps which comprise intimately contacting a glyceride fat of the group consisting of oils of the coconut oil group and their hydrogenated derivatives with a low temperature interesterification catalyst, at a temperature below 130° F., at which a substantial portion of the fat is liquid, to cause rearrangement of the fatty acid radicals in the fat molecules, the temperature being sufficiently low to permit crystallization of solid triglycerides of low solubility as same are formed, maintaining such temperature of the glyceride fat while progressive crystallization of solid triglycerides of low solubility takes place and until the complete capillary melting point of the glyceride fat undergoing rearrangement is above 87° F. but not substantially above 115° F., inactivating the catalyst and converting the glyceride mixture into an edible confectioners' hard butter.

3. In the process of making a confectioners' hard butter the steps which comprise intimately contacting coconut oil with a low temperature interesterification catalyst, at a temperature higher than 50° F. and within a temperature range of which the lower limit is the lowest temperature at which a substantial portion of the fat is liquid and the upper limit is the highest temperature at which solid triglycerides formed in the reaction can crystallize, maintaining the temperature of the glyceride fat at said temperature until the melting point is above 87° F., inactivating the catalyst and converting the glyceride mixture into an edible confectioners' hard butter.

4. In the process of making a confectioners' hard butter the steps which comprise intimately contacting palm kernel oil with a low temperature interesterification catalyst, at a temperature higher than 50° F. and within a temperature range of which the lower limit is the lowest temperature at which a substantial portion of the fat is liquid and the upper limit is the highest temperature at which solid triglycerides formed in the reaction can crystallize, maintaining the temperature of the glyceride fat at said temperature until the melting point is above 87° F., inactivating the catalyst and converting the glyceride mixture into an edible confectioners' hard butter.

5. In the process of making a confectioners' hard butter, the steps which comprise intimately contacting a glyceride fat of the coconut oil group with a low temperature interesterification catalyst at a temperature, below 130° F., at which a substantial portion of the fat is liquid, to cause rearrangement of the fatty acid radicals in the fate molecules, the temperature being sufficiently low to permit crystallization of solid triglycerides of low solubility as same are formed, maintaining such temperature of the glyceride fat while progressive crystallization of solid triglycerides of low solubility takes place, inactivating the catalyst, hydrogenating the rearranged fat, and converting the resulting glyceride mixture into an edible confectioners' hard butter.

6. In the process of making a confectioners' hard butter, the steps which comprise intimately contacting a glyceride fat of the coconut oil group with a low temperature interesterification catalyst at a temperature, below 130° F., at which a substantial portion of the fat is liquid, to cause rearrangement of the fatty acid radicals in the fat molecules, the temperature being sufficiently low to permit crystallization of solid triglycerides of low solubility as same are formed, maintaining such temperature of the glyceride fat while progressive crystallization of solid triglycerides of low solubility takes place, inactivating the catalyst, hydrogenating the rearranged fat to an iodine value from about one to about five, and converting the resulting glyceride mixture into an edible confectioners' hard butter.

7. As a product of manufacture suitable for use as a confectioners' hard butter, a fat selected from the group consisting of oils of the coconut oil group and their hydrogenated derivatives, subjected to molecular rearrangement by interesterification in accordance with the process of claim 1 and, by reason of such molecular rearrangement, having a complete capillary melting point higher than the original fat but not substantially higher than 115° F., the property of breaking sharply and suddenly at 70° F., which property is at least equal to that of a solid fraction of substantially the same final melting point obtained from the original oil by fractional crystallization, and, as compared with the original oil, having in its higher melting triglyceride component a higher proportion of myristic and higher saturated fatty acids as mixed triglycerides.

EDDY W. ECKEY.

REFERENCES CITED

The following references are of record in the file of this patent:

UNITED STATES PATENTS

| Number | Name | Date |
|---|---|---|
| 2,154,452 | Jenness | Apr. 18, 1939 |
| 2,309,949 | Gooding | Feb. 2, 1943 |

Certificate of Correction

Patent No. 2,442,536.　　　　　　　　　　　　　　　　　　June 1, 1948.

EDDY W. ECKEY

It is hereby certified that errors appear in the printed specification of the above numbered patent requiring correction as follows: Columns 3 and 4, lines 43 to 53, inclusive, strike out the table, and insert the same in Columns 5 and 6, after line 26; columns 5 and 6, lines 27 to 37, inclusive, strike out the table, and insert the same in columns 3 and 4, after line 42; column 10, line 55, claim 5, for "fate" read *fat*; and that the said Letters Patent should be read with these corrections therein that the same may conform to the record of the case in the Patent Office.

Signed and sealed this 17th day of August, A. D. 1948.

[SEAL]

THOMAS F. MURPHY,
*Assistant Commissioner of Patents.* low solubility takes place, inactivating the catalyst, hydrogenating the rearranged fat to an iodine value from about one to about five, and converting the resulting glyceride mixture into an edible confectioners' hard butter.

7. As a product of manufacture suitable for use as a confectioners' hard butter, a fat selected from the group consisting of oils of the coconut oil group and their hydrogenated derivatives, subjected to molecular rearrangement by interesterification in accordance with the process of claim 1 and, by reason of such molecular rearrangement, having a complete capillary melting point higher than the original fat but not substantially higher than 115° F., the property of breaking sharply and suddenly at 70° F., which property is at least equal to that of a solid fraction of substantially the same final melting point obtained from the original oil by fractional crystallization, and, as compared with the original oil, having in its higher melting triglyceride component a higher proportion of myristic and higher saturated fatty acids as mixed triglycerides.

EDDY W. ECKEY.

REFERENCES CITED

The following references are of record in the file of this patent:

UNITED STATES PATENTS

| Number | Name | Date |
|---|---|---|
| 2,154,452 | Jenness | Apr. 18, 1939 |
| 2,309,949 | Gooding | Feb. 2, 1943 |

Certificate of Correction

Patent No. 2,442,536.　　　　　　　　　　　　　　　　　June 1, 1948.

EDDY W. ECKEY

It is hereby certified that errors appear in the printed specification of the above numbered patent requiring correction as follows: Columns 3 and 4, lines 43 to 53, inclusive, strike out the table, and insert the same in Columns 5 and 6, after line 26; columns 5 and 6, lines 27 to 37, inclusive, strike out the table, and insert the same in columns 3 and 4, after line 42; column 10, line 55, claim 5, for "fate" read *fat*; and that the said Letters Patent should be read with these corrections therein that the same may conform to the record of the case in the Patent Office.

Signed and sealed this 17th day of August, A. D. 1948.

[SEAL]

THOMAS F. MURPHY,
*Assistant Commissioner of Patents.*